(Model.)

J. D. SMITH.
CORN PLANTER.

No. 285,768.  Patented Sept. 25, 1883.

WITNESSES
Phil C. Dietrich
W. R. Keyworth

INVENTOR
Jos. D. Smith
by T. M. Alexander
Attorney

N. PETERS, Photo-Lithographer, Washington, D. C.

(Model.)
2 Sheets—Sheet 2.
J. D. SMITH.
CORN PLANTER.
No. 285,768. Patented Sept. 25, 1883.
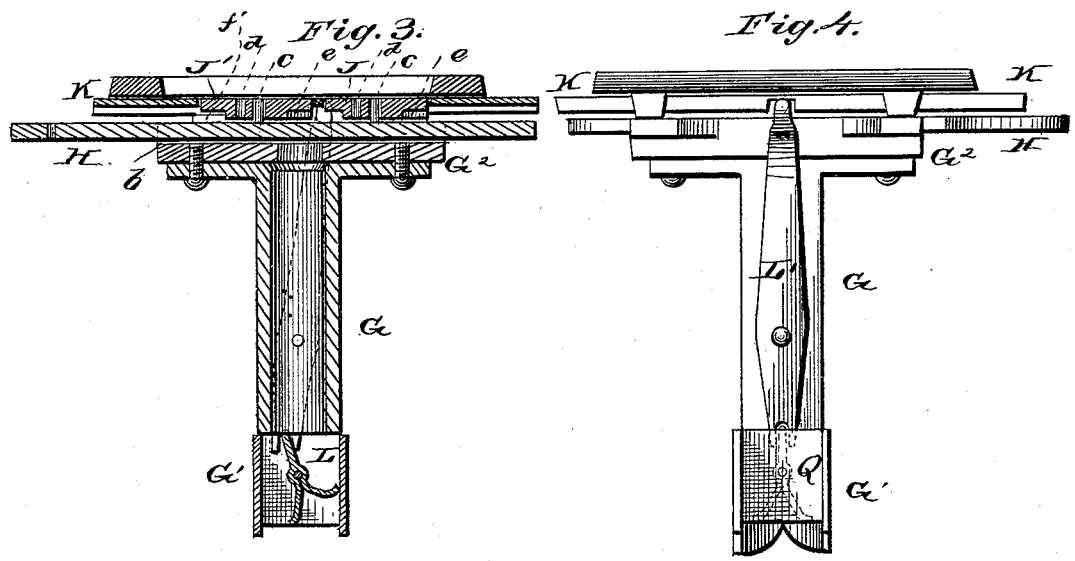
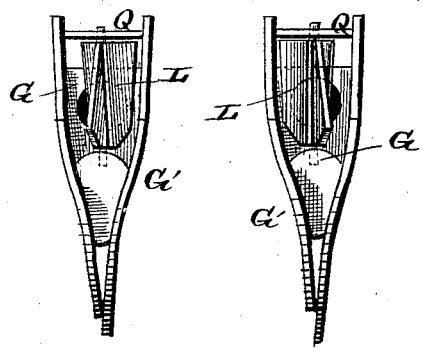
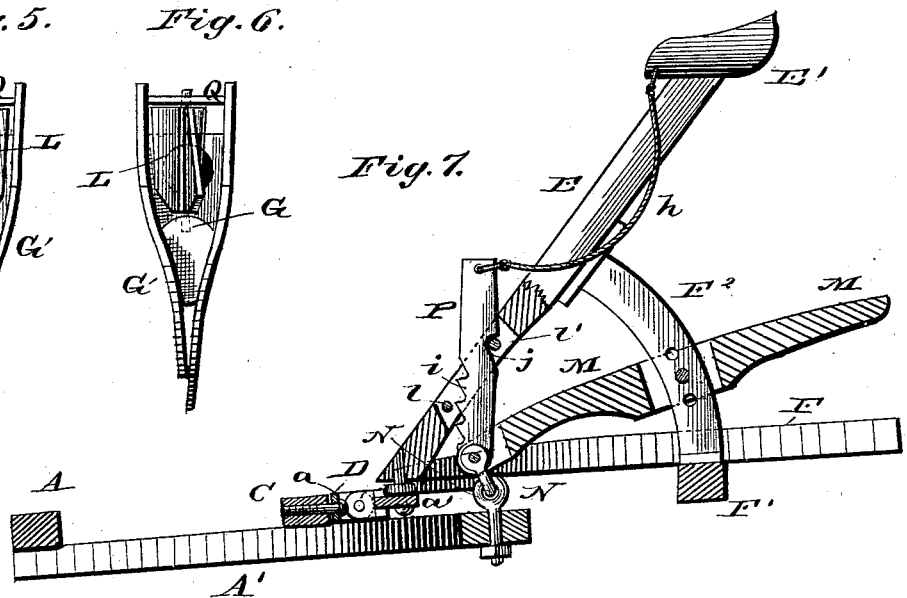
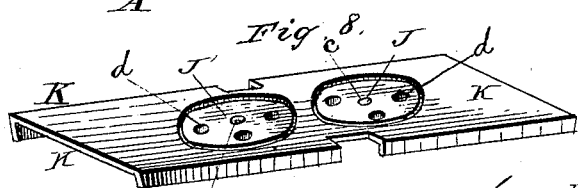
WITNESSES
Phil C. Dietrich
W R Keyworth
INVENTOR
Jos. D. Smith
by J W Alexander
Attorney

UNITED STATES PATENT OFFICE.

JOSEPH D. SMITH, OF ROCKFORD, ILLINOIS, ASSIGNOR TO HIMSELF AND LORENZO D. MINNICK, OF SAME PLACE.

CORN-PLANTER.

SPECIFICATION forming part of Letters Patent No. 285,768, dated September 25, 1883.

Application filed April 25, 1883. (Model.)

*To all whom it may concern:*

Be it known that I, JOSEPH D. SMITH, of Rockford, in the county of Winnebago and State of Illinois, have invented certain new and useful Improvements in Corn-Planters; and I do hereby declare that the following is a full, clear, and exact description thereof, reference being had to the accompanying drawings, and to the letters of reference marked thereon, which form part of this specification, in which—

Figure 1:
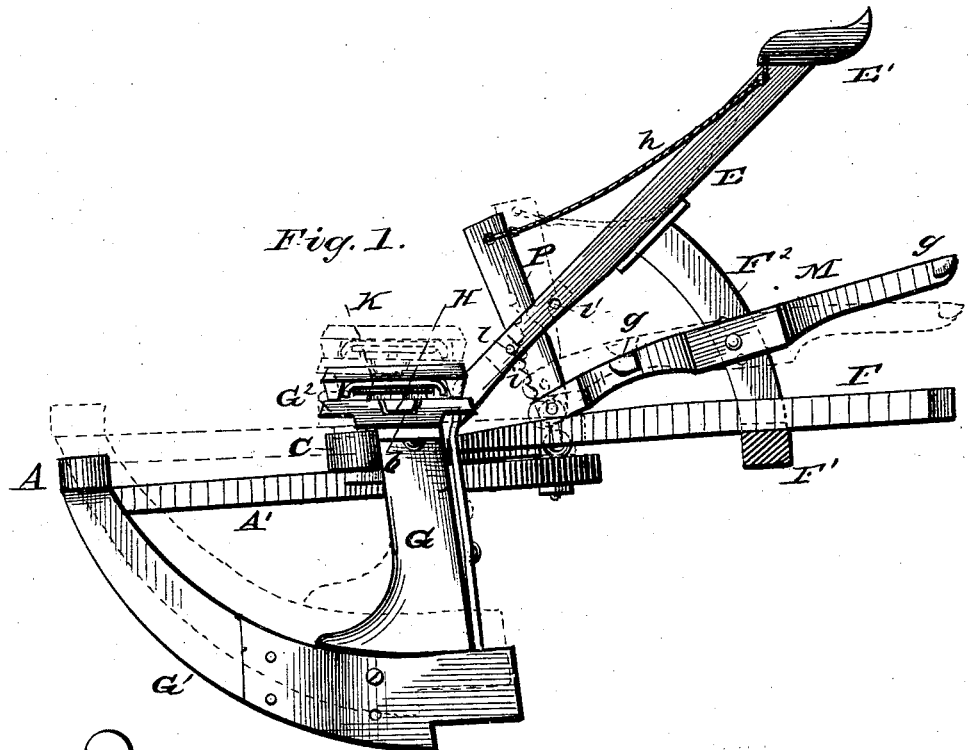
Figure 2:
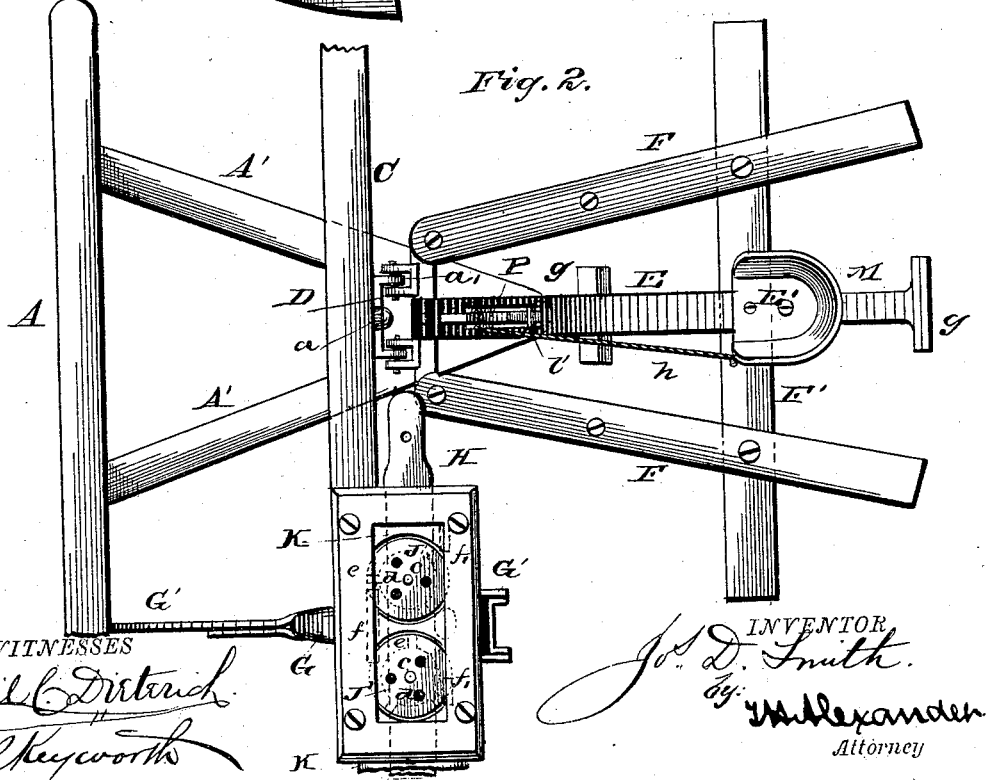

Figure 1 is a side elevation of my machine without the wheels, showing the drill-openers down in working position, and in dotted lines indicating the same elevated. Fig. 2 is a top view of those portions of the machine which will be herein specifically set forth and claimed. Fig. 3 is a vertical section taken transversely through a portion of the machine, indicating the dropping devices. Fig. 4 is a rear elevation of the dropper. Figs. 5 and 6 show in detail the two positions of the cut-off of the dropper. Fig. 7 is a vertical central section through the machine, taken longitudinally. Fig. 8 is an enlarged view of the guard-plate.

This invention relates to improvements on the corn-droppers which have been secured to me by Letters Patent dated on the 12th day of September, 1882, and numbered 264,419; and the nature of it consists in certain novel improvements whereby the grains are dropped with greater regularity than heretofore, and the main articulating frame is made adjustable by the driver on his seat, for the purpose of raising or depressing the drill-openers, and also for depressing the drill-openers into the ground at the will of the driver when moving over hard ground, all of which will be fully understood from the following description, when taken in connection with the annexed drawings.

A designates a draft-beam, to which the pole is attached, and A' A' designate two beams, which are rigidly attached to said draft-beam and form therewith a triangular brace.

C designates the transverse dropper-carrying beam, on each end of which are secured the dropping devices hereinafter explained. At the middle of the length of this dropper-carrying beam is pivoted a clevis, D, the pivotal connection being indicated in Fig. 7- by the letter $a$. To the wings of this clevis, which is allowed to oscillate laterally, I pivot the foot-piece $a'$ of the inclined support E of the driver's seat E', and also the bars F F, which, with the axle F', constitute the rear pivoted section of the main frame.

G designates a cast-metal seed tube or conductor, through which the corn falls after leaving the hopper; and G' is a curved drill opener or shoe, having an open heel, and rigidly secured to the tube G, and also to the front transverse beam A, as shown in the drawings.

The tube or conductor G is rigidly secured to the horizontal transverse beam C, and it is constructed with a T-head, on which is secured the guide $G^2$, for the dropper-slide H, which may be actuated by a hand-lever, or, if desired, by check-row wheels. This slide H works in a groove, $b$, made into the face of the guide $G^2$, and from the top of this slide protrude studs $c\,c$, around which turn the circular droppers J J', which have the seed-cells $d$ through them. The tops of these droppers are flat and flush with the top surface of a thin metal guard, K, which, with the droppers, constitutes the hopper-bottom, and is movable with the slide H.

The guard K prevents grains of corn from getting beneath the edges of the rotary dropping-plates and clogging them, and it also serves another purpose, hereinafter explained.

The bottoms of the rotary dropping-plates are constructed with radial ribs $e$, corresponding in number to the number of seed-cells, and arranged equidistant from each other, which ribs impinge against lugs $f\,f'\,f'$ on the guide $G^2$ during the reciprocating movements of the slide H and guard K, and give an intermittent rotary motion to the dropping-plates. Thus it will be seen that the charges of corn-grains are dropped from the hopper into the tube G.

At the bottom of the tube G, and between the wings of the shoe G' and its back plate, I pivot a vibrating cut-off, L, having inclined surfaces, as shown.

L' designates a vibrating lever, which is pivoted to the back of the tube G. The lower bifurcated end of the lever L' receives freely the upper acute edge of the cut-off L, and the upper end of this lever is received in a notch made in the back edge of the reciprocating guard.

Now, it will be seen that the cut-off L receives vibration from the slide H, acting through the medium of the guard K and lever L', and that the charges of corn are temporarily arrested at the bottom of the shoe G, and from this dropped directly into the drill. I thus by an exceedingly simple contrivance prevent the corn from being scattered.

The rear part of the driver's-seat support E is rigidly connected to the axle F' by a strut, F², to which strut a treadle-lever, M, is pivoted, having transverse foot-pieces g in convenient relation to the driver when in his seat. The front end of the treadle-lever M is connected by a shackle, N, or its equivalent, to the rear end of the front section of the main frame.

P designates a notched rod, which is pivoted at its lower end to the shackle N, and provided at its upper end with a pull-rope, h, which is attached to the driver's seat. The notched rod P passes freely through a long slot made through the driver's-seat support E, and it is constructed with notches i in its front edge, which are pitched upward, and a notch, j, in its rear edge, which is pitched downward. When the notches i are engaged with a transverse pin, l, through the seat-support, the shoes will be held down in working position.

When it is desired to turn the machine, the driver pulls on the rope h and releases the rod from its pin l; at the same time he depresses the rear end of the treadle-lever M, which operation lifts the dropper-frame, with its shoes, free from the ground. The machine will then be supported only by its wheels and the draft-tongue on the necks of the horses. When the shoes are free from the ground, the frame is held up by the rear notch, j, of rod P, which will engage with a pin, l'. If at any time during the operation of the machine the driver desires to forcibly press the shoes into the ground, he can do so by depressing with his feet the front end of the treadle-lever M, and holding the same down by the notched rod P and its pin l.

It will be seen that the double-joint connection between the front and rear sections of the frame allows perfect freedom of movement to these sections, so that they will accommodate themselves to inequalities of surface passed over.

It will also be seen that the rear part or heel of the shoe has an open top, the object of which is to allow the dropper or driver to inspect the dropping at all times. The plate Q forms a back to the shoe and a rear bearing for the vibrating cut-off L.

It will finally be seen that the double-inclined vibrating cut-off is narrower at its front end than at its rear end, and that the charges of corn will quickly settle down toward the rear end in consequence of the inclination backward and laterally of the wings of the cut-off, which form pockets that keep all the grains of every charge closely together at or near the surface of the ground.

Having thus fully described my invention, what I claim as new, and desire to secure by Letters Patent, is—

1. In a corn-dropper, the combination of the slide, the sliding guard-plate K, having overlapping notched edges, carrying the two rotary perforated disks, and the lugs on the guide-plate for rotating said disks, all constructed and adapted to operate substantially in the manner and for the purposes described.

2. In a corn-dropper, the combination of the sliding guard-plate K, having overlapping notched edges and provided with rotary perforated disks, and a notch in one edge, the vibrating lever, and a cut-off at or near the bottom of the shoe, which inclines downward and backward, all constructed and adapted to operate substantially in the manner and for the purposes described.

3. A corn-dropper consisting of a slide, a guard, K, having overlapping notched edges, rotary perforated dropping-disks, a vibrating cut-off, a lever connecting the said guard with the cut-off, a drill-opener, and a seed-tube, all constructed and adapted to operate substantially in the manner and for the purposes described.

4. The combination, with the grooved guide at the upper end of the seed-tube, the reciprocating slide bearing rotary dropping-disks, the sliding guard having overlapping edges, the vibrating cut-off, and the lever for transmitting motion to the cut-off, all constructed and adapted to operate substantially in the manner and for the purposes described.

5. The combination, with a jointed sectional frame bearing corn-dropping devices, of an inclined seat-support, a vertically-reciprocating treadle-lever, and a notched rod loosely connected to the rear end of the said frame and to the said treadle, the pull-cord h, attached to said notched rod and to the driver's seat, and transverse pins i i in the slot of said seat-support, all constructed and adapted to operate substantially in the manner and for the purposes described.

6. The combination, in a corn-dropper, of a treadle-lever, a notched holding-down and supporting rod, the transverse pins i i in the slot of the seat-support, the pull-cord h, attached to said rod and to the driver's seat, and a sectional jointed draft-frame, all constructed and adapted to operate substantially in the manner and for the purposes described.

7. The combination, with the open-top heel of the shoe, of a vibrating double-inclined cut-off, and the back bearing-plate, Q, for said cut-off, all constructed and adapted to operate substantially in the manner and for the purposes described.

In testimony that I claim the foregoing as my own I affix my signature in the presence of two witnesses.

JOSEPH D. SMITH.

Witnesses:
T. H. ALEXANDER,
FRANK O. MCCLEARY.